United States Patent [19]

Takano et al.

[11] Patent Number: 5,037,071
[45] Date of Patent: Aug. 6, 1991

[54] VIBRATION ISOLATING APPARATUS

[75] Inventors: Kazuya Takano, Kamakura; Hiroshi Kojima, Yokohama, both of Japan

[73] Assignee: Bridgestone Corporation, Tokyo, Japan

[21] Appl. No.: 485,494

[22] Filed: Feb. 27, 1990

[30] Foreign Application Priority Data

Feb. 27, 1989 [JP] Japan ................... 1-46206

[51] Int. Cl.⁵ ................... F16F 15/04; F16F 6/00; F16M 3/00
[52] U.S. Cl. ................... 267/140.1; 262/219
[58] Field of Search ............ 267/140.1 AE, 140.1 E, 267/140.1 R, 140.1 C, 140.1 A, 219, 35; 248/562, 638

[56] References Cited

U.S. PATENT DOCUMENTS

| | | | |
|---|---|---|---|
| 4,720,087 | 1/1988 | Duclos et al. | 267/140.1 AE |
| 4,757,981 | 7/1988 | Hartel | 267/140.1 AE |
| 4,759,534 | 7/1988 | Hartel | 267/140.1 AE |
| 4,793,599 | 12/1988 | Ishioka | 267/140.1 AE |
| 4,861,006 | 8/1989 | Takano et al. | 267/140.1 AE |

FOREIGN PATENT DOCUMENTS 3423698 1/1985 Fed. Rep. of Germany ... 267/140.1 AE
60-113835 6/1985 Japan .

Primary Examiner—Matthew C. Graham
Attorney, Agent, or Firm—Oliff & Berridge

[57] ABSTRACT

A vibration isolating apparatus interposed between a vibration-occurring portion and a vibration-receiving portion includes a liquid chamber partitioned into a plurality of small liquid chambers, an orifice allowing the small chambers to communicate with each other, and an electroviscous fluid filled in the liquid chamber and the orifice. Disposed in the liquid chamber are a movable plate for partitioning the liquid chamber, a groove portion for accomodating a peripheral edge of the movable plate in such a manner as to be movable in a thicknesswise direction of the movable plate by a predetermined amount, and a pair of electrodes for imparting an electric field to the electroviscous fluid in the groove portion. Hence, when the vibration isolating apparatus receives low-frequency vibrations, the pair of electrodes are energized to increase the viscosity of the electroviscous fluid between the electrodes, allowing the movable plate to be secured in the groove.

12 Claims, 8 Drawing Sheets

VIBRATION ISOLATING APPARATUS

BACKGROUND OF THE INVENTION

1. Field of the Invention

The present invention relates to a vibration isolating apparatus in which a plurality of small liquid chambers are disposed between a vibration generating portion and a vibration receiving portion so as to absorb vibrations by means of flow resistance of a liquid moving between the small liquid chambers.

2. Description of the Related Art

A known vibration isolating apparatus for an engine mount, a carburetor mount, a body mount and so forth for use in automobiles is provided with a liquid chamber part of which is formed of a resilient member (Japanese Patent Laid-Open No. 113835/1985). This liquid chamber is partitioned into a plurality of small liquid chambers by partition walls, and the small liquid chambers communicate with each other through restraining passages. The arrangement is such that vibrations are absorbed by resistance occurring when the liquid in one small liquid chamber passes through the restraining passage and moves to another small liquid chamber at the time of occurrence of the vibrations.

In addition, in this vibration isolating apparatus, when high-frequency vibrations which can clog the restraining passages have occurred, a movable body provided on the partition wall moves by small degrees, with the result that an increase in the internal pressure of the liquid chamber is restrained, thereby absorbing high-frequency vibrations (100-400 Hz) of reverberatory sounds and the like.

With this type of vibration isolating apparatus, however, when low-frequency vibrations (8-15 Hz during engine shaking and 20-40 Hz during idling) occur during engine shaking, idling, or the like, the movable body also moves, with the result that the amount of liquid passing through the restraining passage declines. Consequently, it is impossible to obtain an effective attenuating effect owing to the resistance of the liquid passing through the restraining passages.

SUMMARY OF THE INVENTION

Accordingly, an object of the present invention is to provide a vibration isolating apparatus which makes it possible to obtain an effective attenuating effect in wide-ranging frequencies by allowing the movement of a movable body to be prevented at the time of occurrence of low frequency vibrations, thereby overcoming the above-described drawbacks of the conventional art.

To this end, in accordance with the present invention, there is provided a vibration isolating apparatus interposed between a vibration-occurring portion and a vibration-receiving portion, comprising: a liquid chamber constituted by a plurality of expandable small liquid chambers; a restraining passage allowing the small liquid chambers to communicate with each other; an electroviscous fluid which is filled in the liquid chamber and the restraining passage and whose viscosity varies in correspondence with the magnitude of an electric field applied to the electroviscous fluid; a movable body disposed in the liquid chamber in such a manner as to be movable by a small degree; and an electrode disposed in such a manner as to sandwich the movable body and adapted to impart an electric field to the electroviscous fluid.

In the vibration isolating apparatus of the invention having the above-described arrangement, during occurrence of low-frequency vibrations a voltage is applied to a pair of electrodes so as to increase the viscosity of the electroviscous fluid located in the vicinity of the movable body, thereby fixing the movable body. As a result, the pressure within the liquid chamber can be increased to allow a large amount of electroviscous fluid to flow into the restraining passage. Consequently, even during occurrence of low-frequency vibrations the electroviscous fluid can be allowed to flow into the restraining passage as much as possible. Hence, it is possible to effectively obtain an effect of attenuating low-frequency vibrations by virtue of the resistance of the electroviscous fluid flowing into the restraining passage.

The above and other objects, features and advantages of the invention will become more apparent from the following detailed description of the invention when taken in conjunction with the accompanying drawings.

BRIEF DESCRIPTION OF THE DRAWINGS

FIGS. 1 to 3 illustrate a first embodiment of a vibration isolating apparatus in accordance with the present invention, in which FIG. 1 is a vertical cross-sectional view;

FIG. 2 is an overall perspective view of a partitioning body;

FIG. 3 is an overall perspective view of a partitioning piece;

FIGS. 4 to 6 illustrate a second embodiment of the vibration isolating apparatus in accordance with the present invention, in which FIG. 4 is a cross-sectional view taken along line IV—IV of FIG. 5.

FIG. 5 is a cross-sectional view taken along line V—V of FIG. 4;

FIG. 6 is an exploded perspective view;

FIGS. 7 and 8 illustrate a third embodiment of the vibration isolating apparatus in accordance with the present invention in which FIG. 7 is a cross-sectional view taken along line VII—VII of FIG. 8; and FIG. 8 is a cross-sectional view taken along line VIII—VIII of FIG. 7.

DESCRIPTION OF THE PREFERRED EMBODIMENTS

Figure 1:
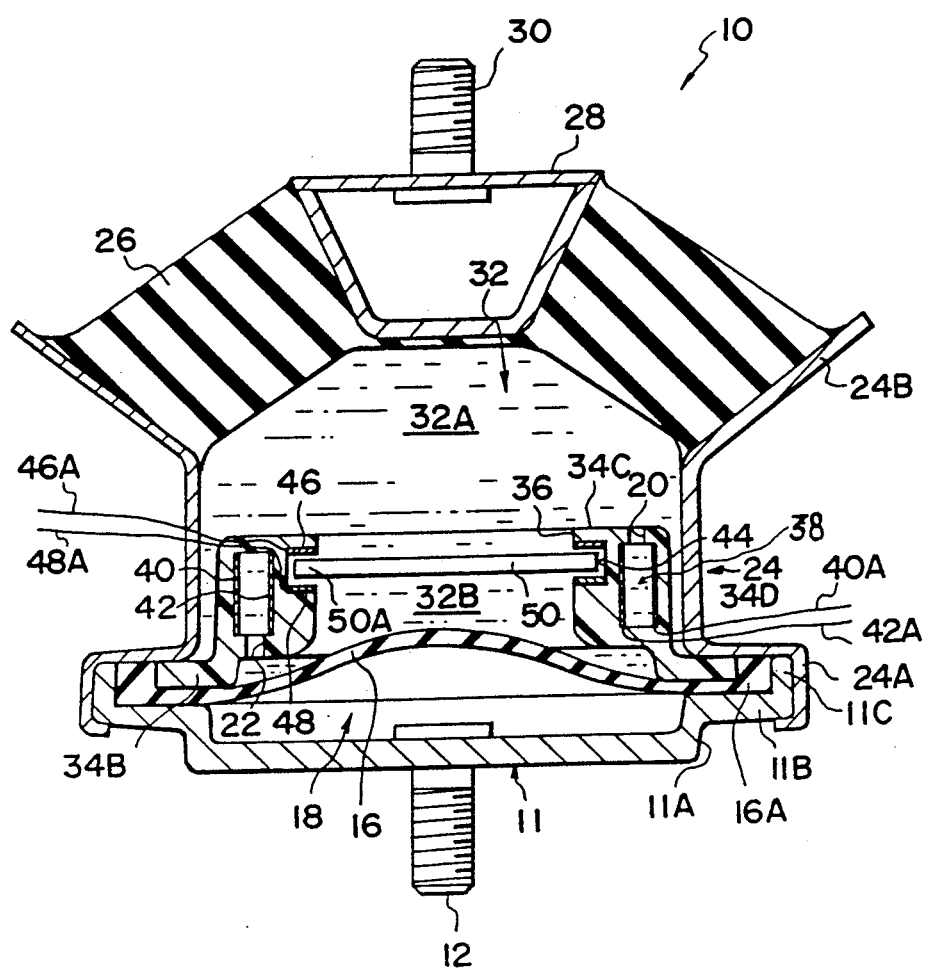
Figure 2:
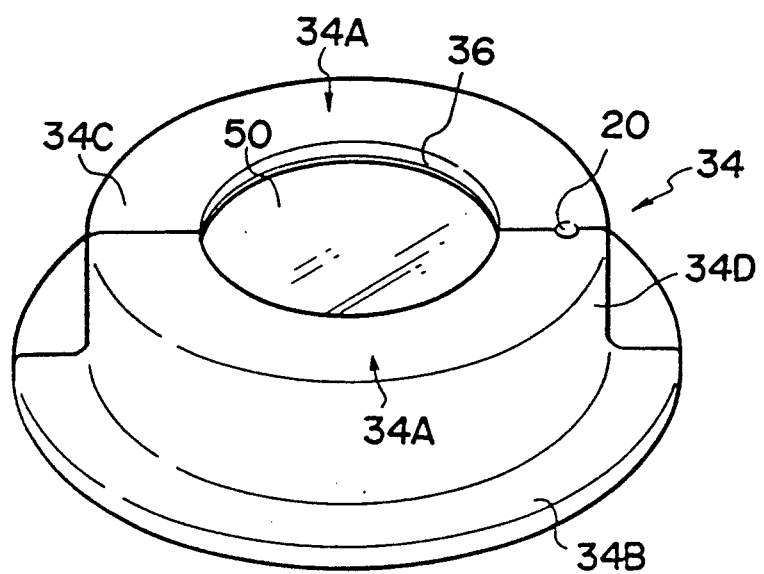
Figure 3:
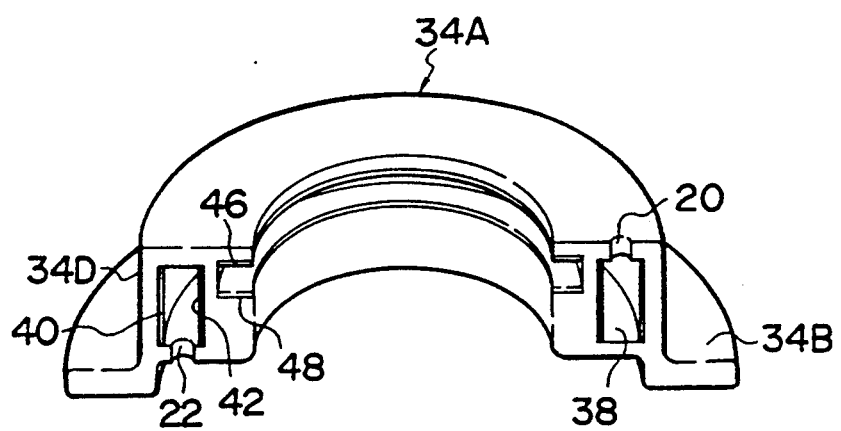

FIGS. 1 to 3 illustrate a first embodiment of a vibration isolating apparatus 10 in accordance with the present invention. As shown in FIG. 1, the vibration isolating apparatus 10 has a bottom plate 11 which is provided with a mounting bolt 12 in such a manner as to project from an underside of a central portion thereof so as to secure the vibration isolating apparatus 10 to, for example, a body of an automobile.

An outer peripheral portion of the bottom plate 11 is formed into a tubular upright wall portion 11A by being bent orthogonally. Connected to an upper end of the rising wall portion 11A is a flange 11B which has a rising portion 11C formed by being bent orthogonally upwards.

A flange 24A formed at a lower end of an outer cylinder 24 is secured to the flange 11B by means of calking, and a peripheral edge A of a diaphragm 16 is clamped by the flange 11B and the flange 24A. A space formed between the diaphragm 16 and the bottom plate 11 serves as an air chamber 18, and is made to communicate with the outside, as necessary.

An upper end of the outer cylinder 24 is formed into an expanded opening portion 24B whose inside diameter is expanded gradually, an outer periphery of an annular vibration absorbing body 26 being vulcanized thereto. The vibration absorbing body 26 is formed of rubber, for example, an outer peripheral portion of a support base 28 being vulcanized to an inner peripheral portion thereof. The support base 28 serves as a mounting portion for an automobile engine (not illustrated), and is provided with a mounting bolt 30 in such a manner as to project therefrom so as to secure the automobile engine.

A liquid chamber 32 is formed by an inner peripheral portion of the outer cylinder 24, a lower end of the vibration absorbing body 26, and the diaphragm 16. An electroviscous fluid is filled in the liquid chamber 32.

As shown in FIG. 2, a hat-shaped partitioning body 34 is disposed in the liquid chamber 32 and partitions the liquid chamber 32 into a main liquid chamber 32A and an auxiliary liquid chamber 32B. This partitioning body 34 is formed into a hat-shaped configuration by joining two half-hat-shaped partitioning pieces 34A formed by being cut along a plane passing through its axis, as shown in FIG. 3. A pair of flanges 34B of the partitioning body 34 extend radially and are clamped and secured by a peripheral edge portion 16A of the diaphragm 16 and by the flange 11B of the bottom plate 11 and the flange 24A of the outer cylinder 24 (see FIG. 1). The partitioning body 34 is fabricated of an electrically insulating material such as a synthetic resin, a ceramic, or the like, and a circular hole 36 is formed in a central portion of a top plate portion 34C of the partitioning body 34.

As shown in FIG. 1, a rising portion 34D of the partitioning body 34 is provided with a large thickness, and an orifice 38, which serves as a restraining passage, is formed in the rising portion 34D in such a manner as to surround the axis of the partitioning body 34. In addition, a through hole 20 and a through hole 22 are respectively formed in the top plate portion 34C and rising portion 34D of the partitioning body 34 corresponding to the orifice 38. For this reason, the orifice communicates with the main liquid chamber 32A via the through hole 20 and with the auxiliary liquid chamber 32 B via the through hole 22.

A pair of electrode plates 40, 42 are respectively provided on opposite side surfaces of the orifice 38 in such a manner as to oppose each other, and are connected to an unillustrated controller via conductive wires 40A, 42A. In this embodiment, the electrode plate 40 is set as a plus pole, and the electrode plate 42 as a minus pole.

As an example of the electroviscous fluid filled in the liquid chamber 32, it is possible to use a mixture essentially consisting of 40-60% by weight of silicate, 30-50% by weight of an organic phase having a low-boiling point, 50-10% by weight of water, and 5% by weight of a dispersing agent. For instance, isododekan can be applied. This electroviscous fluid has characteristics that when it is not being energized via electrodes, the fluid exhibits the viscosity of an ordinary hydraulic fluid, and its viscosity upon energization changes with a change in the electric field strength.

Accordingly, by energizing the electrode plates 40, 42, the viscosity of the electroviscous fluid in the orifice 38, and the electroviscous fluid can be solidified in some cases, thereby substantially shutting off the communication between the main liquid chamber 32A and the auxiliary liquid chamber 32B.

An annular groove 44 for loosely fitting with a movable plate and having a U-shaped section is formed along an entire inner peripheral surface of the rising portion 34D. An outer peripheral portion 50A of a movable plate 50, which together with the partitioning plate 34 partitions the liquid chamber 32, is loosely fitted with the groove 44 for loosely fitting with a movable plate. A pair of electrode plates 46, 48 are respectively provided on upper and lower surfaces of the groove 44 in such a manner as to oppose each other. The electrode plates 46 48 are connected to the unillustrated controller via conductive wires 46A, 48A. In this embodiment, the electrode plate 46 is set as a plus pole, and the electrode plate 48 as a minus pole. Accordingly, by energizing the electrode plates 46, 48, the viscosity of the electroviscous fluid located in the vicinity of the outer peripheral portion 50A of the movable plate 50 is increased, and the electroviscous fluid is solidified in some cases, thereby making it possible to prevent the movement of the movable plate 50.

The operation of this embodiment will be described hereinunder.

The bottom plate 11 is secured to an unillustrated chassis via the mounting bolt 12, and the engine mounted on the support base 28 is secured by means of the mounting bolt 30.

Vibrations occurring in the engine are transmitted to the vibration absorbing body 26 via the support base 28, and the vibrations are absorbed by the internal friction of the vibration absorbing body 26.

In addition, since the vibrations are transmitted to the liquid chamber 32 via the vibration absorbing body 26, the electroviscous fluid inside the liquid chamber 32 moves through the orifice 38, so that the vibrations are also absorbed by the passing resistance occurring during this movement.

When frequencies of the engine vibrations become high, the orifice 38 becomes clogged, so that the vibrations cannot be absorbed at this portion. However, as the hydraulic pressure within the main liquid chamber 32A and the auxiliary liquid chamber 32B increases, the movable plate 50 is moved by this pressure, thereby restraining a rise of the dynamic spring.

When very small vibrations (±0.1–0.4 mm) of very low frequencies (8–15 Hz) take place such as during engine shaking, all the electrode plates 40, 42, 46, 48 are energized via the conductive wires 40A, 42A, 46A, 48A. Consequently, the viscosity of the electroviscous fluid in the orifice 38 and in the vicinity of the movable plate 50 increases, with the result that the electroviscous fluid is prevented from moving through the orifice 38 and the movable plate 50 from moving, thereby allowing the vibrations of very low frequencies to be absorbed.

In addition, when very small vibrations (±0.1–0.4 mm) of very low frequencies (8–15 Hz) take place such as during engine idling, if the movable plate 50 moves and pressure fluctuations in one of the main liquid chamber 32A and the auxiliary liquid chamber 32B are readily imparted to the other, it becomes impossible for the orifice 38 to absorb the vibrations. In the case of such vibrations of low frequencies, therefore, only the electrode plates 46, 48 are energized via the conductive wires 46A, 48A. Consequently, the electroviscous fluid in the vicinity of the movable plate 50 undergoes an increase in viscosity and thereby hampers the movement of the movable plate 50. Hence, due to a pressure rise in the main liquid chamber 32A and the auxiliary liquid chamber 32B, a large amount of electroviscous fluid passes through the orifices, thereby making it possible to positively absorb the low-frequency vibrations.

It should be noted that although in this embodiment the partitioning body 34 is formed by combining the two half-hat-shaped partitioning pieces 34A, as shown in FIG. 3, the partitioning body 34 may be formed of one hat-shaped partitioning plate from the outset.

Figure 4:
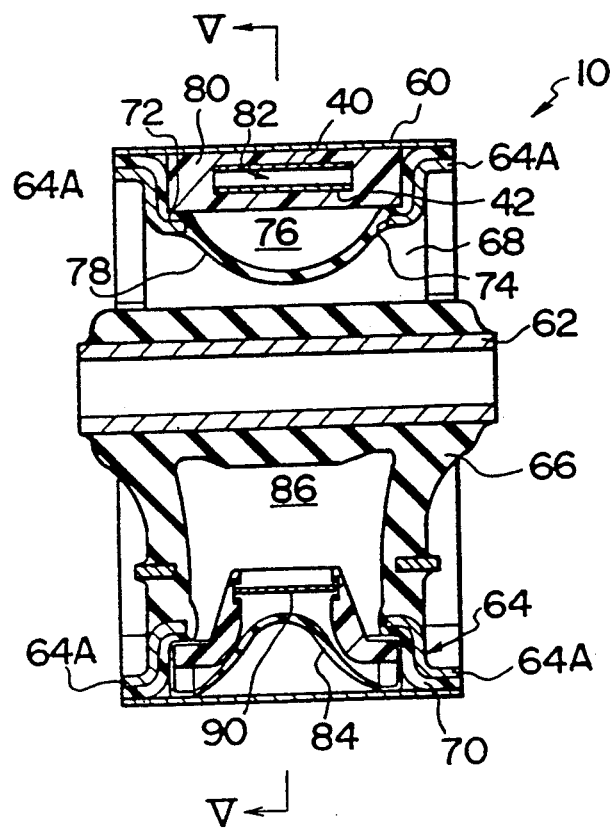
Figure 5:
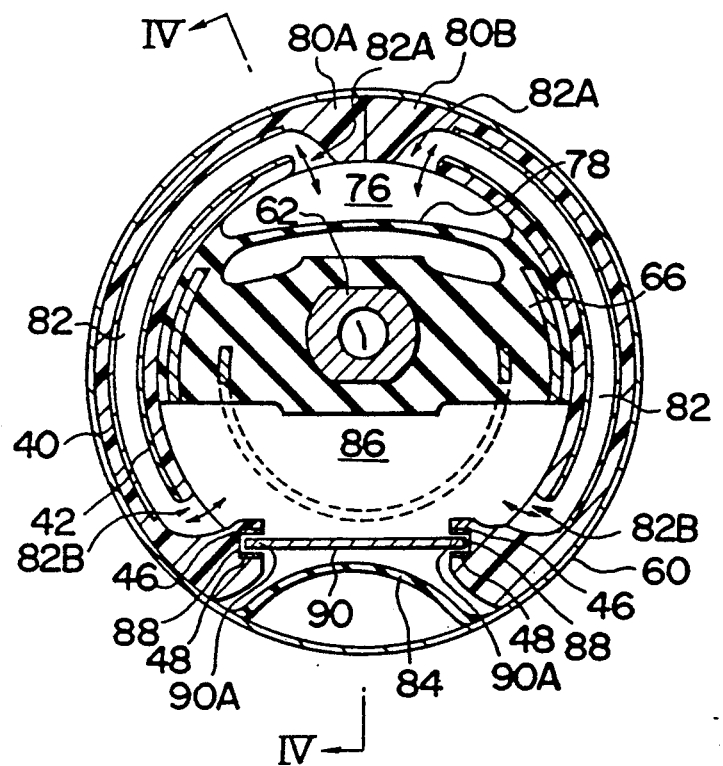
Figure 6:
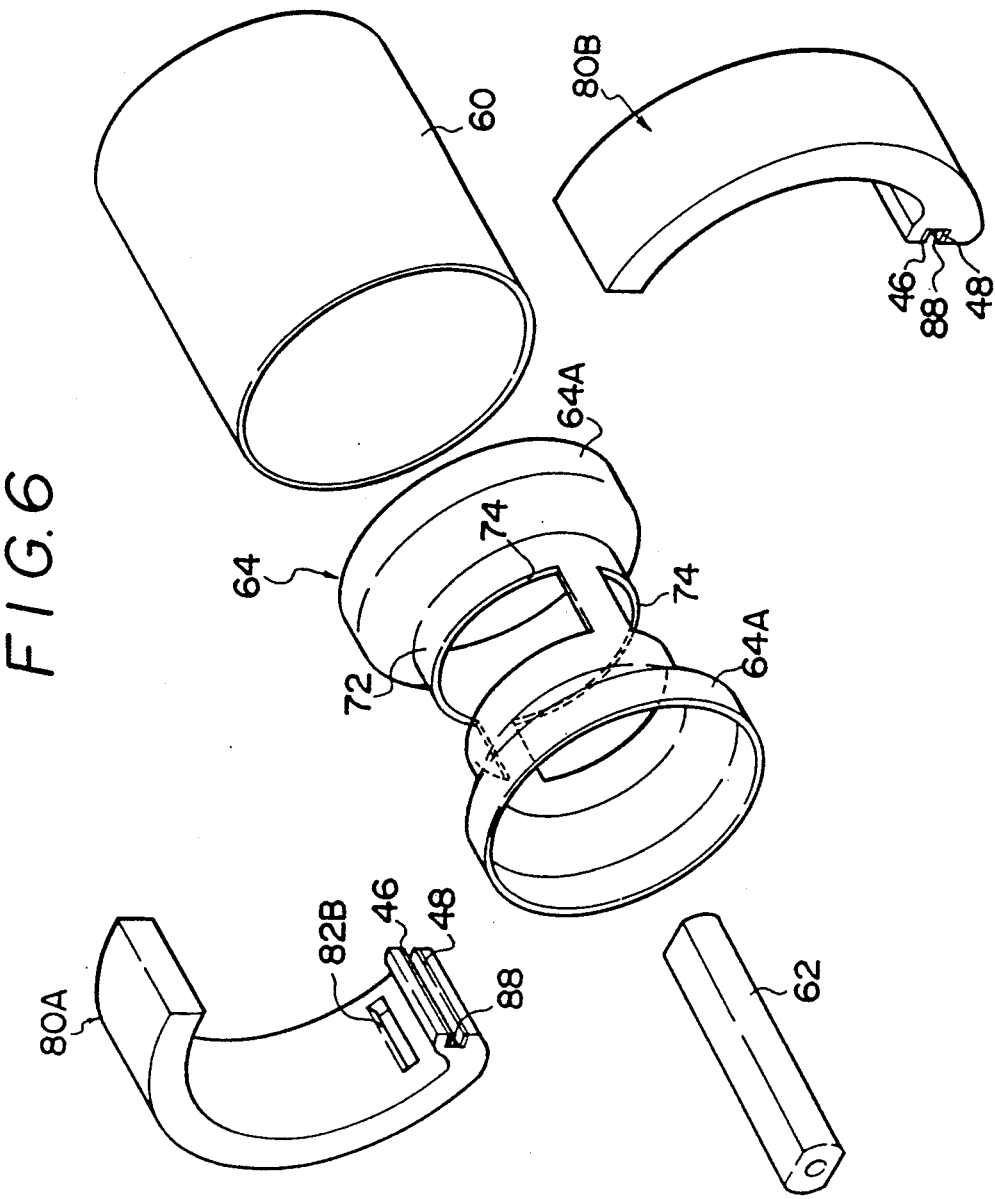

FIGS. 4 to 6 illustrate a second embodiment of the vibration isolating apparatus 10 in accordance with the present invention. As shown in FIG. 4, in this vibration isolating apparatus 10, an outer cylinder 60 and an inner cylinder 62 are disposed with their axes arranged in parallel with each other, one being connected to the unillustrated chassis of the automobile, and the other to the engine.

An intermediate cylinder 64 is interposed between the outer cylinder 60 and the inner cylinder 62, and body rubber 66 serving as a resilient member is interposed between the outer cylinder 60 and the inner cylinder 62. The body rubber 66 surrounds an outer peripheral surface of the inner cylinder 62 and has part of the intermediate cylinder 64 embedded therein. This body rubber 66 is formed of a rubber material whose principal component is natural rubber having excellent properties in terms of durability and the like.

A cavity portion 68 is formed in a portion of the body rubber 66 above the inner cylinder 62 (upper side in FIG. 4), and the cavity portion 68 extends in the axial direction of the vibration isolating apparatus 10, as shown in FIG. 4.

End portions 64A of the intermediate cylinder 64 that are located on the opposite sides in the axial direction are formed with an enlarged diameter, and the intermediate cylinder 64 is press fitted in the outer cylinder 60 with part of the body rubber 66 vulcanized to outer peripheral surfaces of the end portions 64A.

As shown in FIG. 6, a reduced-diameter recessed portion 72 is formed in an axially intermediate portion of the intermediate cylinder 64, and a pair of rectangular notches 74 are respectively formed in the reduced-diameter recessed portion 72 on both sides thereof with the inner cylinder 62 placed therebetween (i.e., on upper and lower sides in FIG. 4). A diaphragm 78, which is one component member of an auxiliary liquid chamber 76, is fitted in the upper notch 74, as shown in FIG. 4.

Consequently, a major portion of the diaphragm 78 excluding its periphery projects into the cavity portion 68, as shown in FIG. 4.

As shown in FIG. 4, an orifice unit 80 fabricated of an electrically insulating material such as a synthetic resin, a ceramic, or the like is fitted in the reduced-diameter recessed portion 72 of the intermediate cylinder 64. As shown in FIG. 6, the orifice unit 80 comprises a pair of arcuate orifice unit pieces 80A, 80B, one ends of the orifice unit pieces 80A, 80B are brought into contact with each other so as to form a substantially C-shaped configuration. Arcuate cavities are respectively formed in the orifice unit pieces 80A, 80B so as to constitute an orifice 82 serving as a restraining passage.

A pair of electrode plates 40, 42 are provided on the inner peripheral surfaces of the orifice 82 in such a manner as to oppose each other, and are connected to an unillustrated controller via unillustrated conductive wires. In this embodiment, the electrode plate 40 is set as a plus pole, and the electrode plate 42 as a minus pole.

In a lower portion (lower side in FIG. 4) of the vibration isolating apparatus 10, an outer peripheral portion of the diaphragm 84 is vulcanized to an inner peripheral surface of the outer cylinder 60, and a main liquid chamber 86 is formed by the body rubber 66 and the diaphragm 84.

As shown in FIG. 5, in this main liquid chamber 86, the other ends of the orifice unit pieces 80A, 80B are disposed by being spaced apart from each other, a groove 88 for loosely fitting with a movable plate and having a U-shaped section is formed in each of the other end portions. An outer peripheral portion 90A of a rectangular movable plate 90 is loosely fitted to each groove 88 for loosely fitting with a movable plate. A pair of electrode plates 46, 48 are respectively provided on upper and lower surfaces of each groove 88 for loosely fitting to a movable plate, the electrode plates 46, 48 being connected to the unillustrated controller via unillustrated conductive wires. In this embodiment, the electrode plate 46 is set as a plus pole, and the electrode plate 48 as a minus pole.

The auxiliary liquid chamber 76 and the main liquid chamber 86 communicate with each other through ports 82A, 82B formed at ends of the orifice 82, so that the electroviscous fluid can move between the auxiliary liquid chamber 76 and the main liquid chamber 86.

Accordingly, in this embodiment as well, when very small vibrations (±0.1–0.4 mm) of low frequencies (20–40 Hz) take place such as during engine idling, if the movable plate 90 moves and pressure fluctuations in one of the main liquid chamber 86 and the auxiliary liquid chamber 76 are readily imparted to the other, it becomes impossible for the orifice 82 to absorb the vibrations.

Accordingly, only the electrode plates 46, 48 are energized via the conductive wires, so that the electroviscous fluid in the vicinity of the movable plate 90 undergoes an increase in viscosity and thereby hampers the movement of the movable plate 90. Hence, as the pressure within the main liquid chamber 86 is thereby increased, the low-frequency vibrations can be absorbed positively.

Although in this embodiment an arrangement has been described in which the movable plate 90 is disposed in the main liquid chamber 86 which is one of the small liquid chambers, this arrangement can be applied to the first embodiment. That is, the arrangement of the first embodiment may be such that the liquid chamber 32 is partitioned into the main liquid chamber 32A and the auxiliary liquid chamber 32B by means of a partitioning plate or the like, and the movable plate 50 is disposed in the main liquid chamber 32A.

Figure 7:
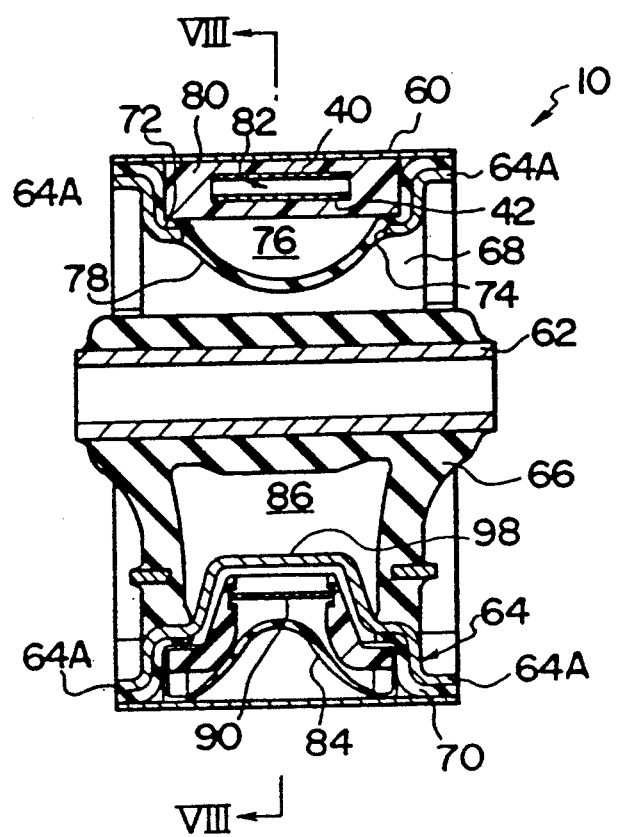
Figure 8:
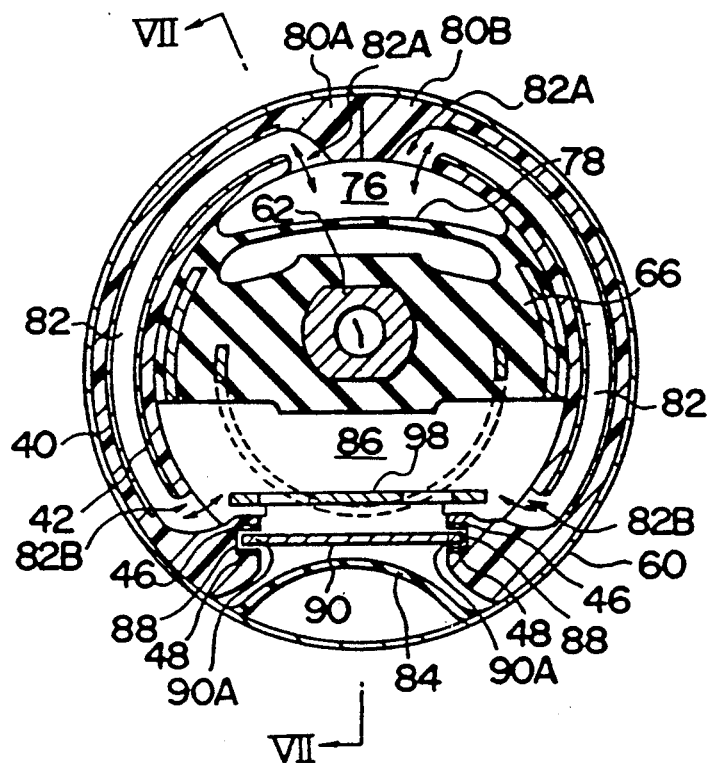

FIGS. 7 and 8 illustrate a third embodiment of the vibration isolating apparatus 10 in accordance with the present invention.

As shown in FIG. 7, in this vibration isolating apparatus 10 as well, the outer cylinder 60 and the inner cylinder 62 are disposed with their axes arranged in parallel with each other in the same way as the vibration isolating apparatus 10 of the second embodiment, one being connected to the chassis of the automobile and the other to the engine.

In addition, and also in the same way as the vibration isolating apparatus 10 of the second embodiment, the intermediate cylinder 64 is interposed between the outer cylinder 60 and the inner cylinder 62, and the body rubber 66 serving as a resilient member is interposed between the outer cylinder 60 and the inner cylinder 60.

As shown in FIG. 7, a stopper 98 is formed integrally in a lower portion (lower side in FIG. 7) of the reduced-diameter recessed portion 72 formed in an axially intermediate portion of the intermediate cylinder 64.

The arrangement of the stopper 98 is such that when the engine is coupled with the intermediate cylinder 64, even if the intermediate cylinder 64 is lowered by the engine's load, the stopper 98 supports the intermediate cylinder 64 and the body rubber 66, thereby allowing the movable body 90 and the diaphragm 78 to be protected.

It should be noted that such a stopper may also be disposed in the main liquid chamber 32A of the first embodiment so as to prevent the movement of the support base 28 and the movable plate 50 close to each other by more than a predetermined amount, thereby protecting the movable plate 50.

As described above, the vibration isolating apparatus in accordance with the present invention exhibits an outstanding advantage in that it can absorb wide-ranging frequencies since the movable body can be set in a fixed state during occurrence of low-frequency vibrations.

What is claimed is:

1. A vibration isolating apparatus interposed between a vibration-occurring portion and a vibration-receiving portion, comprising:
    a liquid chamber constituted by a plurality of expandable small liquid chambers;
    a restraining passage allowing said small liquid chambers to communicate with each other;
    an electroviscous fluid which is filled in said liquid chamber and said restraining passage and whose viscosity varies in correspondence with the magnitude of an electric field applied to said electroviscous fluid;
    a movable body disposed in said liquid chamber independently of said vibration-occurring portion and said vibration-receiving portion in such a manner as to be movable by a small degree;
    a supporting member disposed in said liquid chamber to movably support said movable body; and
    a pair of electrodes disposed in such a manner as to sandwich said movable body and adapted to impart an electric field to said electroviscous fluid.

2. A vibration isolating apparatus according to claim 1, wherein said movable body is disposed in such a manner as to partition said liquid chamber into said small liquid chambers.

3. A vibration isolating apparatus according to claim 1, wherein said movable body is disposed in one of said small liquid chambers.

4. A vibration isolating apparatus according to claim 1, wherein said supporting member is comprised of a restricting means for restricting the range of movement of said movable body to said movement by a small degree.

5. A vibration isolating apparatus according to claim 4, wherein said restricting means is constituted by a groove for accommodating an edge of said movable body.

6. A vibration isolating apparatus according to claim 5, wherein said electrode is supported by mutually opposing side walls of said groove.

7. A vibration isolating apparatus according to claim 1, further comprising another pair of electrodes disposed along inner walls of said restraining passage.

8. A vibration isolating apparatus interposed between a vibration-occurring portion and a vibration-receiving portion, comprising:
    a liquid chamber constituted a pair of small liquid chambers expanded or contracted by vibrations;
    an orifice allowing said pair of small liquid chambers to communicate with each other;
    an electroviscous fluid which is filled in said liquid chamber and said orifice and whose viscosity varies in correspondence with the magnitude of an electric field applied to said electroviscous fluid;
    a movable plate disposed in said liquid chamber;
    a groove portion for accommodating an edge portion of said movable plate in such a manner as to allow said movable plate to move by a predetermined amount in the thicknesswise direction of said movable plate; and
    a first pair of electrodes supported by opposing surfaces of said groove portion.

9. A vibration isolating apparatus according to claim 8, wherein said movable plate is disposed in such a manner as to partition said liquid chamber into said pair of small liquid chambers.

10. A vibration isolating apparatus according to claim 8, wherein said liquid chamber is interposed between a first tubular member secured to one of said vibration-generating portion and said vibration-receiving portion on the one hand, and a second tubular member secured to the other and including an axis substantially parallel with an axis of said first tubular member and an inner peripheral surface opposed to an outer peripheral surface of said first tubular member on the other.

11. A vibration isolating apparatus according to claim 10, wherein said movable plate is disposed in one of said small liquid chambers, a stopper member being interposed between said movable plate and said first tubular member for restricting relative movement of said movable plate and said first tubular member in a direction of proximity to each other more than a predetermined amount.

12. A vibration isolating apparatus according to claim 8, further comprising a second pair of electrodes disposed in said orifice and adapted to energize the electroviscous fluid in said orifice.

* * * * *